(12) United States Patent
Srivastava et al.

(10) Patent No.: US 12,711,037 B1
(45) Date of Patent: Aug. 18, 2026

(54) CHARACTER-LEVEL LOG PARSING

(71) Applicant: SAP SE, Walldorf (DE)

(72) Inventors: Prerak Srivastava, Antibes (FR); Giulio Corallo, Vallauris (FR); Sergey Rybalko, Le Cannet (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/086,677

(22) Filed: Mar. 21, 2025

(51) Int. Cl.
*G06F 11/34* (2006.01)
*G06F 40/284* (2020.01)
*G06N 3/0464* (2023.01)

(52) U.S. Cl.
CPC ........ *G06F 11/3476* (2013.01); *G06F 40/284* (2020.01); *G06N 3/0464* (2023.01)

(58) Field of Classification Search
CPC .. G06F 11/3476; G06F 40/284; G06N 3/0464
See application file for complete search history.

(56) References Cited

U.S. PATENT DOCUMENTS

| | | | | |
|---|---|---|---|---|
| 7,974,942 | B2 * | 7/2011 | Pomroy | G06F 21/6245 707/610 |
| 8,495,429 | B2 * | 7/2013 | Fu | G06F 11/3608 714/25 |
| 9,202,078 | B2 * | 12/2015 | Abuelsaad | G06F 16/116 |
| 10,883,345 | B2 * | 1/2021 | Xu | B01D 29/33 |
| 12,231,451 | B2 * | 2/2025 | Srivatsa | H04L 41/16 |
| 2022/0067280 | A1 * | 3/2022 | Wagner | G06N 3/0895 |
| 2025/0053587 | A1 * | 2/2025 | Coulter | G06F 21/554 |

FOREIGN PATENT DOCUMENTS

| | | | | |
|---|---|---|---|---|
| CN | 113128213 A | * | 7/2021 | G06F 16/35 |
| EP | 3378007 B1 | * | 1/2022 | G06F 21/6254 |

OTHER PUBLICATIONS

Ma et al., "CharBERT: Character-aware Pre-trained Language Model," arXiv:2011.01513v1, 12 pages, Nov. 3, 2020.
Clark et al., "Canine: Pre-training an Efficient Tokenization-Free Encoder for Language Representation," *Transactions of the Association for Computational Linguistics,* vol. 10, pp. 73-91, https://doi.org/10.1162/tact_a_00448, 2022.
Thaler et al., "Towards a neural language model for signature extraction from forensic logs," 6 pages (downloaded Jan. 24, 2025).

(Continued)

*Primary Examiner* — Maher N Algibhah
(74) *Attorney, Agent, or Firm* — Klarquist Sparkman, LLP

(57) ABSTRACT

A computer-implemented method can receive a log message comprising a sequence of L characters, wherein L is a positive integer, generate embeddings for the sequence of L characters, and generate feature vectors for N tokens based on the embeddings. A token represents M consecutive characters in the log message, M is an integer greater than one, and N is a smallest integer greater than or equal to L divided by M. The method can predict N binary coded values based on the feature vectors for N tokens, and generate a sequence of L parameter masks based on the N binary coded values. A parameter mask indicates that a corresponding character in the log message is a static character or a variable character. Related systems and software for implementing the method are also disclosed.

20 Claims, 12 Drawing Sheets

102

104 106

| Log templates | Parameters |
|---|---|
| <*> "DELETE <*> <*>" status: <*> len: <*> time: <*> | ('common.wav', '1990-11-05', '1-4996-7406-6', '04:14:07', '00:09:15', '1-132-39180-6') |
| Skipping STATUS for <*> because CHECK failed with error: (<*>) | ('001-420-290-5519x45121', '2013-07-23' ) |

(56) References Cited

OTHER PUBLICATIONS

He et al., "Drain: An Online Log Parsing Approach with Fixed Depth Tree," *2017 IEEE 24th International Conference on Web Services*, 8 pages, 2017.

Khan et al., "Guidelines for Assessing the Accuracy of Log Message Template Identification Techniques," *2022 IEEE/ACM 44th International Conference on Software Engineering* (*ICSE*), 12 pages, May 21-29, 2022.

Dai et al., "Logram: Efficient Log Parsing Using n-Gram Dictionaries," arXiv:2001.03038v1, 13 pages, Jan. 7, 2020.

Liu et al., "Logzip: Extracting Hidden Structures via Iterative Clustering for Log Compression," arXiv:1910.00409v1, 11 pages, Sep. 24, 2019.

Svacina et al., "On Vulnerability and Security Log analysis: A Systematic Literature Review on Recent Trends," *RACS '20*, pp. 175-180, Oct. 13-16, 2020.

Lin et al., "Log Clustering based Problem Identification for Online Service Systems," *2016 IEEE/ACM 38th IEEE International Conference on Software Engineering Companion, ICSE Companion '16*, pp. 102-111, May 14-22, 2016.

Taibi et al., "Product-Focused Software Process Improvement," *23rd International Conference, PROFES 2022*, 682 pages, Nov. 21-23, 2022.

Xu et al., "DivLog: Log Parsing with Prompt Enhanced In-Context Learning," *ICSE '24*, 13 pages, Apr. 14-20, 2024.

Jiang et al., "LILAC: Log Parsing using LLMs with Adaptive Parsing Cache," *Proc. ACM Softw. Eng.*, vol. 1, No. FSE, Article 7, 24 pages, Jul. 2024.

Li et al., "Did We Miss Something Important? Studying and Exploring Variable-Aware Log Abstraction," *2023 IEEE/ACM 45th International Conference on Software Engineering* (*ICSE*), 13 pages, May 14-20, 2023.

Wu et al., "LogPTR: Variable-Aware Log Parsing with Pointer Network," arXiv:2401.05986v1, 5 pages, Jan. 11, 2024.

Le et al., "Log Parsing with Prompt-based Few-shot Learning," arXiv:2302.07435v1, 12 pages, Feb. 15, 2023.

Yu et al., "Brain: Log Parsing With Bidirectional Parallel Tree," *IEEE Transactions on Services Computing*, vol. 16, No. 5, pp. 3224-3237, Sep./Oct. 2023.

Shima, "Length Matters: Clustering System Log Messages using Length of Words," arXiv:1611.03213vl, 10 pages, Nov. 10, 2016.

Zhang et al., "System Log Parsing: A Survey," *IEEE Transactions on Knowledge and Data Engineering*, vol. 35, Issue 8, 20 pages, Dec. 29, 2022.

* cited by examiner

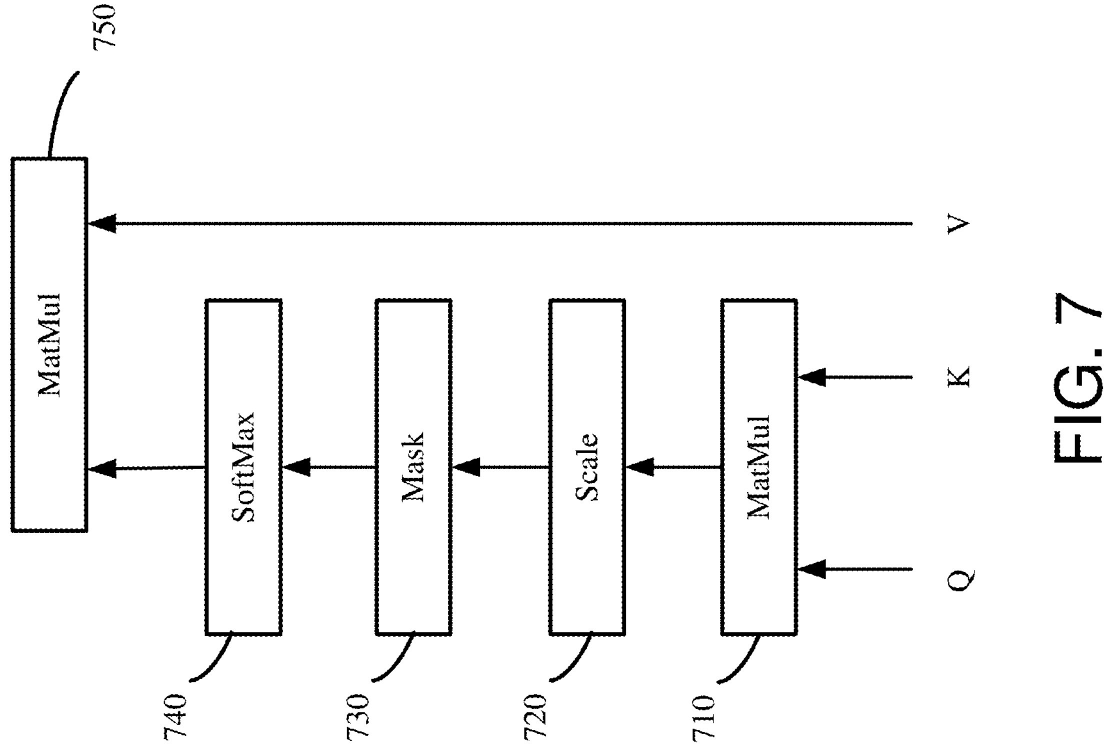
FIG. 7

Log lines/second 1000
800
600
400
200
0

Drain
Brain
LogPPT
LILAC
4Bitparser
Cacheless-4Bitparser

1000

| Log Parser | PA | F1-TA |
|---|---|---|
| Drain | 0.31 | 0.27 |
| Brain | 0.32 | 0.33 |
| LogPPT | 0.34 | 0.33 |
| LILAC | 0.60 | **0.61** |
| **4Bitparser** | **0.64** | 0.60 |

CHARACTER-LEVEL LOG PARSING

BACKGROUND

In modern software systems, log parsing enables the extraction of structured information from raw log messages generated by applications, servers, and cloud environments. Logs play an important role in software maintenance, debugging, performance monitoring, security analysis, and anomaly detection by providing insights into system behavior and failures. Traditional log parsing techniques rely on rule-based methods, regular expressions, or frequency-based clustering, commonly referred as syntax-based method. They often struggle with variations in log formats, unseen patterns, and their inability to capture semantic understanding. More recent approaches leverage machine learning and deep learning models, categorized as semantic parsers, to improve accuracy and adaptability. However, these methods often face challenges in balancing computational efficiency, scalability, and adaptability to dynamic log structures. Thus, there is room for improvement in developing a log parsing method that enhances both accuracy and efficiency while maintaining adaptability to diverse log formats.

BRIEF DESCRIPTION OF THE DRAWINGS

FIG. 7 is a block diagram of an example self-attention mechanism that can be implemented in the encoder of FIG. 6.

FIG. 10 depicts example experimental results.

DETAILED DESCRIPTION

Example Overview of Log Parsing

Log parsing is an essential process in modern computing systems, where vast amounts of log messages (or simply "logs") are continuously generated by applications, cloud environments, and infrastructure components. These log messages provide valuable insights into system behavior, performance, security incidents, and operational anomalies. Engineers and system administrators rely on logs for various tasks, such as debugging software failures, detecting security breaches, optimizing performance, conducting forensic analysis, and so on. However, raw log messages are typically semi-structured, making them difficult to process and analyze efficiently. To address this, log parsing techniques are used to extract structured information by identifying fixed patterns, extracting key parameters, and generating log templates that facilitate automated analysis.

Figure 1:
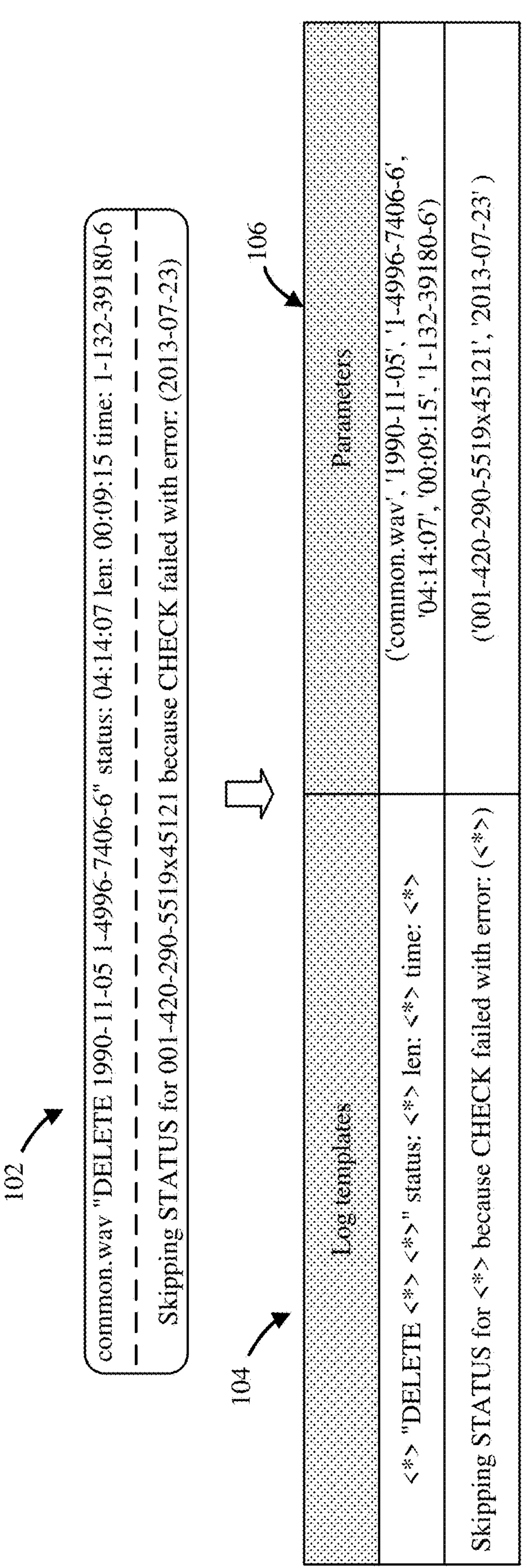
FIG. 1 depicts examples illustrating input and output of log parsing.

FIG. 1 illustrates the concept of log parsing by showing two example log messages 102 and their corresponding structured representations. Each log message 102 contains a mix of static and variable content, where static content remain unchanged and variable content can be replaced with placeholders (e.g., "<*>" in the depicted example or other predefined patterns) to create structured log templates 104. The extracted variable parts, such as filenames, timestamps, error codes, etc., can be stored separately as parameters 106 (and in the same order as their corresponding placeholders) and can be reinserted into the log templates 104 (e.g., substituting corresponding placeholders) when needed. This structured representation enables efficient log analysis by allowing similar log messages to be grouped, searched, and processed without redundant computations.

Conventional log parsers generally fall into two categories: syntax-based parsers and semantic-based parsers. Syntax-based parsers typically use heuristics, token frequency analysis, clustering techniques, and/or manually defined regular expressions to extract structured templates from log messages. Some previous approaches in this category include fixed-depth tree-based methods and rule-based systems that attempt to group logs with similar structures. While syntax-based parsers can be efficient and lightweight, they struggle with variations in log formats, unforeseen log structures, and domain-specific logs that do not conform to predefined rules. They also tend to require manual tuning of parameters, making them less adaptable to evolving log formats.

To address the limitations of syntax-based methods, semantic log parsers have been developed using machine learning and deep learning techniques. Some previous approaches in this category leverage token classification methods. Various other approach have also used the recent few-shot learning methods on pre-trained transformer architectures such as large language models (LLMs) in order to improve log parsing accuracy. These methods attempt to learn the underlying structure of log messages by capturing contextual relationships between tokens. While these methods may improve adaptability and generalization across different log formats, they often introduce significant computational overhead, requiring substantial processing power, large labeled datasets, and frequent retraining to maintain accuracy. Moreover, real-world deployment of LLMs for log parsing often faces challenges related to latency, scalability, and cost, making them impractical for high-volume log processing environments.

Figure 2:
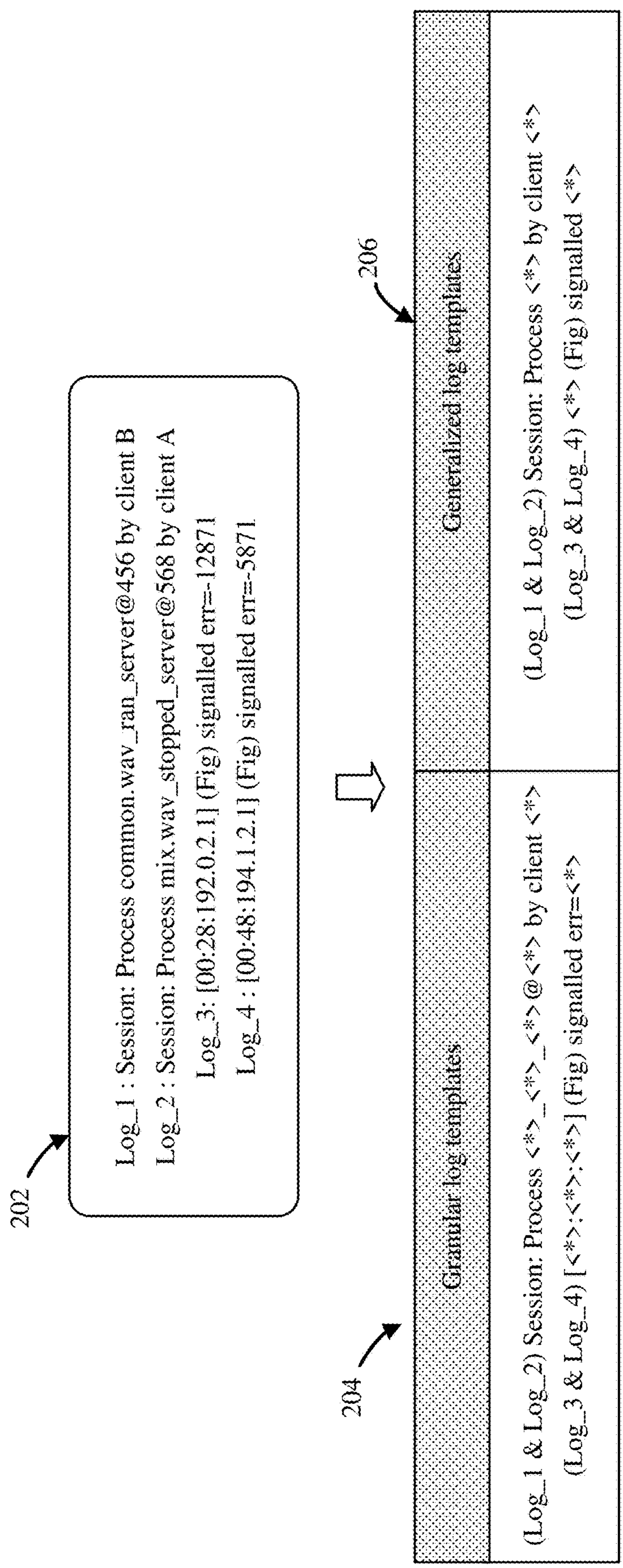
FIG. 2 depicts examples illustrating granularity variations in log parsing.

The field of log parsing also faces several technical challenges beyond efficiency and accuracy. One important issue is the granularity of log templates, where different methods may extract templates with varying levels of detail, leading to inconsistencies in downstream log analysis. As shown in FIG. 2, log messages 202 can be parsed into granular log templates 204 or generalized log templates 206, depending on the level of abstraction applied during parsing. Granular log templates 204 retain finer details, often encoding log structure at the character level, such as capturing specific word positions and delimiter structures. In contrast, generalized log templates 206 abstract the logs at the word level, replacing entire word segments with placeholders while preserving only the broader format of the log messages 202. For example, in FIG. 2, Log_1 and Log_2 are parsed into a granular log template that preserves details about process information, such as filename (e.g., "common.wav" and "mix.wav"), operating status (e.g., "ran" and "stopped"), server (e.g., "server"), and address information (e.g., "456" and "568"), while the generalized log template abstracts these details by replacing them with a single placeholder. Similarly, Log_3 and Log_4 are converted into a granular template that retain the full IP address format and brackets (e.g., preserving the colon separators), while the generalized template abstracts these details. The choice of granularity can impact the effectiveness of log-based analysis. For example, finer granularity of log templates may provide higher specificity for anomaly detection or other usages.

Existing performance metrics for log parsing, such as group accuracy and template accuracy, often fail to capture the impact of template granularity on real-world usability. Additionally, many conventional log parsers rely on white space tokenization, leading to inconsistencies when processing logs with complex formatting, non-standard delimiters, or multi-word parameters. These factors contribute to discrepancies between estimated log templates and the actual ground truth, ultimately affecting the reliability of log-based anomaly detection, root cause analysis, and many other business intelligence applications.

The technologies described herein address many of the challenges described above by introducing a novel character-level log parsing approach that improves accuracy, efficiency, and adaptability. The proposed semantic log parser leverages a hybrid deep learning architecture combining self-attention mechanisms, convolutional networks, bidirectional sequence modeling, and conditional random fields to extract structured log templates with little computational overhead. By eliminating reliance on predefined tokenization rules and optimizing feature representations, the disclosed semantic parser ensures robust log parsing performance across diverse log formats while maintaining high processing speed and scalability. Beyond log parsing, the technologies described herein can be generalized for other structured data extraction tasks, such as parsing configuration files, parsing structured text in medical records, extracting information from financial transaction statements, or the like.

Example Computing System for Semantic Log Parsing

Figure 3:
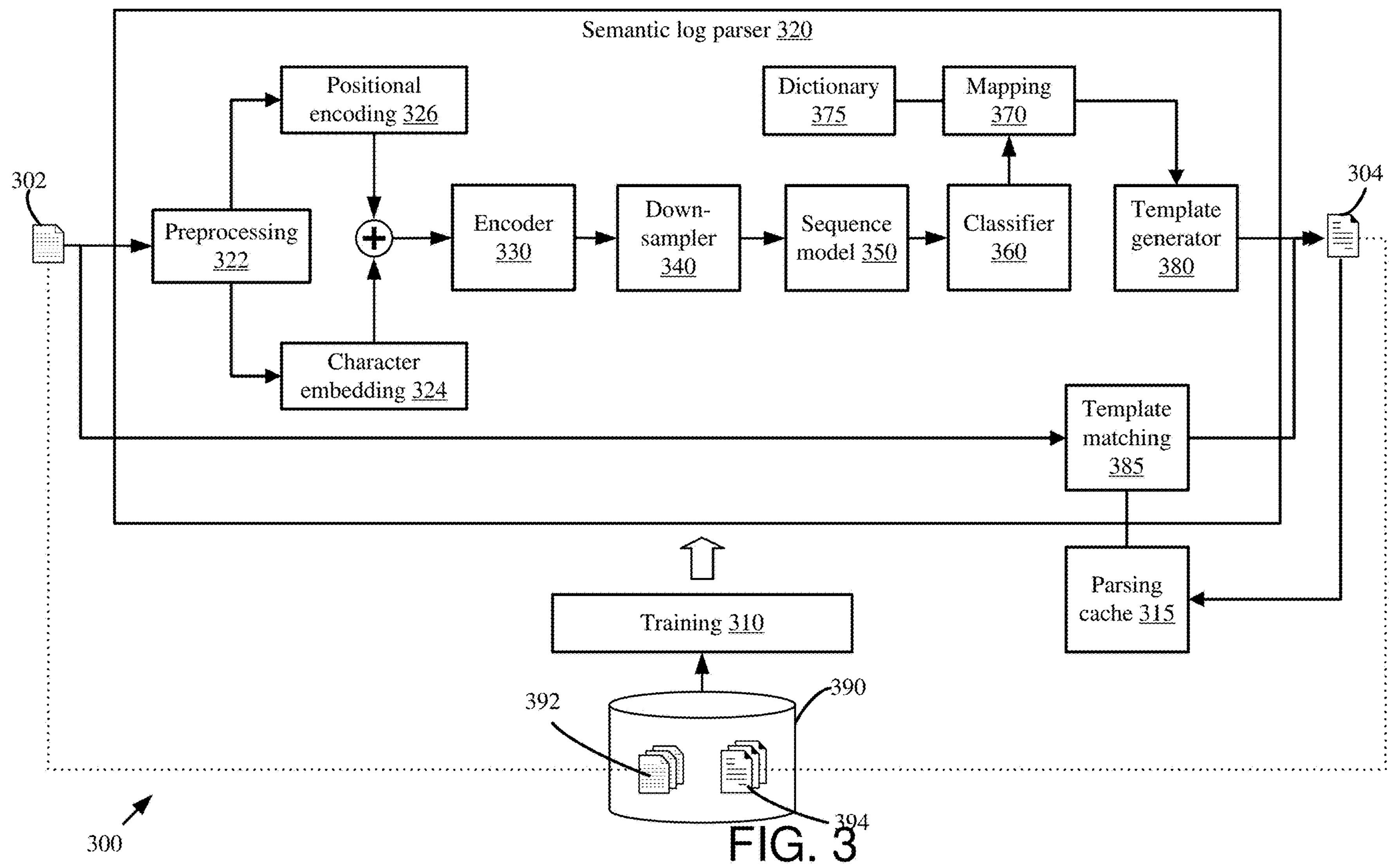
FIG. 3 is a block diagram depicting an example computing system for semantic log parsing.

FIG. 3 shows an overall block diagram of an example computing system 300 for semantic log parsing, according to the technologies disclosed herein.

As shown, the computing system 300 includes a semantic log parser 320 which is configured to automatically process a received log message 302 by transforming it (e.g., in real-time) into a log template 304. As described more fully below, the semantic log parser 320 operates on character-level to identify static and variable characters in the log message 302. As described herein, static characters refer to fixed portions of the log message 302 that remain unchanged across multiple instances of similar log messages, whereas variable characters represent dynamic portions, such as timestamps, numerical identifiers, or other context-specific values, that differ between instances.

The semantic log parser 320 can be trained using a training unit 310, which utilizes a database 390 containing a plurality of input log messages 392 and corresponding ground truth log templates 394 (that is, log templates that were previously generated from the input log messages 392 and whose accuracy has been verified, e.g., through manual inspection and/or automated validation). The training process enables the semantic log parser 320 to accurately classify characters as static or variable for efficient log template generation, while also allowing for continuous learning and dynamic updates as new log formats and structures emerge.

As shown, the semantic log parser 320 can include a number of components organized in a processing pipeline, including a preprocessing unit 322, a character embedding unit 324, a positional encoding unit 326, an encoder 330, a down-sampler 340, a sequence model 350, a classifier 360, a mapping unit 370, and a template generator 380. In some examples, each component can be implemented as a software module. In some examples, any of these components can be implemented in hardware or firmware.

The processing pipeline begins with the preprocessing unit 322, which can be configured to convert the log message 302 into a sequence of individual characters. To ensure proper alignment and consistency, preprocessing unit 322 can also pad the log message 302 with one or more predefined padding characters to ensure that the total length (L) of the log message 302 is divisible by a predefined down-sampling factor (M) which is a predefined integer greater than one. In some examples, the padding characters can be space characters, while it should be understood that other predefined characters can also be used as padding characters.

The character embedding unit 324 can be trained to convert the character sequence generated by the preprocessing unit 322 into dense vector representations, also referred to "embeddings," which capture semantic and contextual information about each character in the character sequence. Various embedding techniques (e.g., Word2Vec, GloVe, CharBERT, CANINE, or the like) can be used by the character embedding unit 324. In some examples, these embeddings can be further enriched by the positional encoding unit 326, which can be configured to incorporate positional information into the embeddings, thereby recognizing sequential dependencies between the characters. In some examples, the positional encoding can be optional.

The resulting positional-enriched embeddings can be passed to the encoder 330, which can apply a self-attention mechanism to measure contextual dependencies between characters, enabling the semantic log parser 320 to recognize patterns in the log structure. In some examples, the encoder 330 can be part of a transformer model, which is a deep learning architecture that utilizes self-attention to capture long-range dependencies and improve sequence representation. In some examples, the encoder 330 can be implemented in alternative neural network architectures.

The output of the encoder 330 can be a matrix including encoded feature vectors representing contextualized character embeddings, which can be processed by the down-sampler 340 configured to reduce the sequence length while preserving essential feature information. In some examples, the down-sampler 340 can include a one-dimensional convolutional neural network (CNN) to aggregate and condense character-level feature representations into token-level feature representations. For example, the down-sampler 340 can group every M consecutive characters into a token, and combine the encoded feature vectors of M characters within each token into a single condensed feature vector for the token. As a result, the output of the down-sampler 340 is a sequence of N condensed feature vectors corresponding to N tokens, where N is the smallest integer greater than or equal to L divided by M (e.g., N=ceil(L/M)). Compared to directly processing the encoded feature vectors (e.g., with full length L), the usage of down-sampler 340 enables more efficient sequence modeling and classification in subsequence processing stages, thus reducing computational complexity while preserving meaningful local features. In some examples, the down-sampler 340 can be implemented using other sequence reduction techniques, such as recurrent neural networks (RNNs), attention-based mechanisms, etc.

In some examples, the output of the down-sampler 340 can be provided as an input to the sequence model 350, which further processes the condensed feature vectors to capture long-range dependencies in the tokenized sequence. In some examples, the sequence model 350 can be implemented as a bidirectional long short-term memory (BiLSTM) neural network. The BiLSTM neural network can process the condensed feature vectors in both forward and backward directions so that each token's feature representation can incorporate information from both past and future tokens. The output of the sequence model 350 can be a matrix including vectors of sequential feature representations (for the N tokens), wherein each vector encodes contextualized information for a token based on its surrounding tokens in the sequence. In some examples, other sequence modeling techniques (e.g., transformer-based models or the like) may be used instead of BiLSTM neural network.

The output of the sequence model 350 can be passed to the classifier 360 to assign labels to each token in the sequence, distinguishing between static and variable characters based on learned dependencies. In some examples, the classifier 360 can be implemented as a Conditional Random Field (CRF) neural network, which can model dependencies between adjacent tokens and predicts N labels (or classes) as output. Each label can encode parameter masks for M consecutive characters within a corresponding token. As described herein, a parameter mask indicates that a corresponding character in the log message 302 is a static character or a variable character. In some examples, each parameter mask can be represented by a binary or Boolean value. In some examples, the classifier 360 can alternatively be implemented using other sequence classification models (e.g., fully connected neural networks, or the like) to predict different labels based on the output of the sequence model 350 (e.g., vectors of sequential feature representations).

In some examples, the N labels predicted by the classifier 360 can be binary coded values. In other words, the M parameter masks corresponding to a token can be encoded into a single binary coded value using a predefined encoding scheme. For instance, if each parameter mask is a binary value (where 1 represents a variable character and 0 represents a static character), the binary coded value for a token can be computed by treating the M-bit parameter mask sequence as a binary number and converting it into a decimal representation. This can be expressed as:

$$BCV=\sum_{i=0}^{M-1} P_i \times 2^i,$$

where BCV is the binary coded value, $P_i$ is the parameter mask for the i-th character in the token ($P_i \in \{0, 1\}$), and M is the number of characters per token. For example, if M=4 and the parameter masks for a given token are {1, 1, 0, 1}, then the corresponding binary coded value would be 13. This encoding provides a compact representation of the parameter masks, reducing the complexity of sequence classification while maintaining structural alignment with the original log message 302.

The mapping unit 370 can be configured to map the N binary coded values generated by the classifier 360 into respective parameter masks arranged in a sequence. In some examples, the mapping unit 370 can utilize a dictionary 375, which can include a lookup table or the like, for converting each binary coded value into M consecutive parameter masks. The mapping unit 370 can process the converted parameter masks and align them with the original log message 302 to ensure proper sequencing, such that the output is a sequence of parameter masks with the same length (L) as the log message 302.

The template generator 380 can use the sequence of L parameter masks generated by the mapping unit 370 to construct the log template 304, retaining static characters from the original log message 302 while replacing variable characters with one or more predefined placeholders. In some examples, consecutive characters indicated as variable masks can be replaced with a single placeholder, such that a placeholder may represent a group of one or more characters. The number of characters grouped into a single placeholder may vary, depending on the length of consecutive variable-character sequences in the parameter masks. For example, referring to FIG. 1, a portion of the log message is "DELETE 1990-11-05 1-4996-7406-6". The corresponding portion of the parsed log template is "DELETE <*> <*>". Here, the date "1990-11-05", which consists of ten characters, and the identifier "1-4996-7406-6", which consists of fifteen characters, are both replaced with a single placeholder each, as all their characters are indicated as variable characters in the parameter masks. It should be understood that the placeholder used in the log template is not limited to the representation depicted in the example (e.g., "<*>"). In some implementations, different symbols, tokens, and/or formatting styles may be used to denote placeholders, depending on system requirements or parsing conventions.

In some examples, to further improve performance, the computing system 300 can maintain a parsing cache 315, which stores previously processed log templates and enables efficient retrieval of parsed results. In the depicted example, the parsing cache 315 is external to the semantic log parser 320. In other examples, the parsing cache 315 can be included within the semantic log parser 320. Before passing a log message through the full processing pipeline (e.g., preprocessing, encoding, down-sampling, etc.), the semantic log parser 320 can first check the parsing cache 315 for an existing template match, allowing the semantic log parser 320 to avoid redundant computations and improve efficiency in environments with high log volume and recurring log patterns.

In some examples, checking for a template match can be performed by a template matching unit 385 configured to compare the log message 302 against log templates stored in the parsing cache 315. Various template matching technique can be used, such as string similarity comparisons (e.g., Levenshtein distance), hashing-based lookups (e.g., locality-sensitive hashing), tree-based matching (e.g., fixed-depth prefix trees), machine learning-based similarity detection, or the like. If a matching template is found, it can be directly used as the parsed result, reducing the need for further processing. Otherwise, the log message 302 is processed by the normal processing pipeline (e.g., from 322 through 380), and the newly generated log template can be added to the parsing cache 315. In some examples, the parsing cache 315 can be configured to dynamically update and refine stored log templates, ensuring that log parsing remains adaptive as log structures evolve.

Further details on individual components of the computing system 300, such as the encoder 330, the down-sampler 340, the sequence model 350, the classifier 360, and the training unit 310, are described more fully below.

In some examples, some of the components depicted in FIG. 3 can be combined into an integrated module. For instance, the character embedding unit 324 and positional encoding unit 326 can be integrated with the preprocessing unit 322. As another example, the mapping unit 370 can be part of the template generator 380.

In some examples, some of the components depicted in FIG. 3 can be optional. For instance, in some implementations, the encoder 330 can be optional such that the positional-enriched embeddings can be directly sent to the down-sampler 340. As another example, in some implementations, the sequence model 350 can be optional such that the condensed feature vectors generated by the down-sampler 340 can be directly sent to the classifier 360. In yet another example, the parsing cache 315 can be optional.

The described computing system 300 can be networked via wired or wireless network connections, including the Internet. Alternatively, the computing system 300 can be connected through an intranet connection.

The systems 300 and any of the other systems described herein can be implemented in conjunction with any of the hardware components described herein, such as the computing systems described below (e.g., processing units, memory, and the like). In any of the examples herein, log messages, log templates, embeddings, feature vectors, and the like can be stored in one or more computer-readable storage media or computer-readable storage devices. The technologies described herein can be generic to the specifics of operating systems or hardware and can be applied in any variety of environments to take advantage of the described features.

Example Parameter Masks and Binary Coded Values

Figure 4:
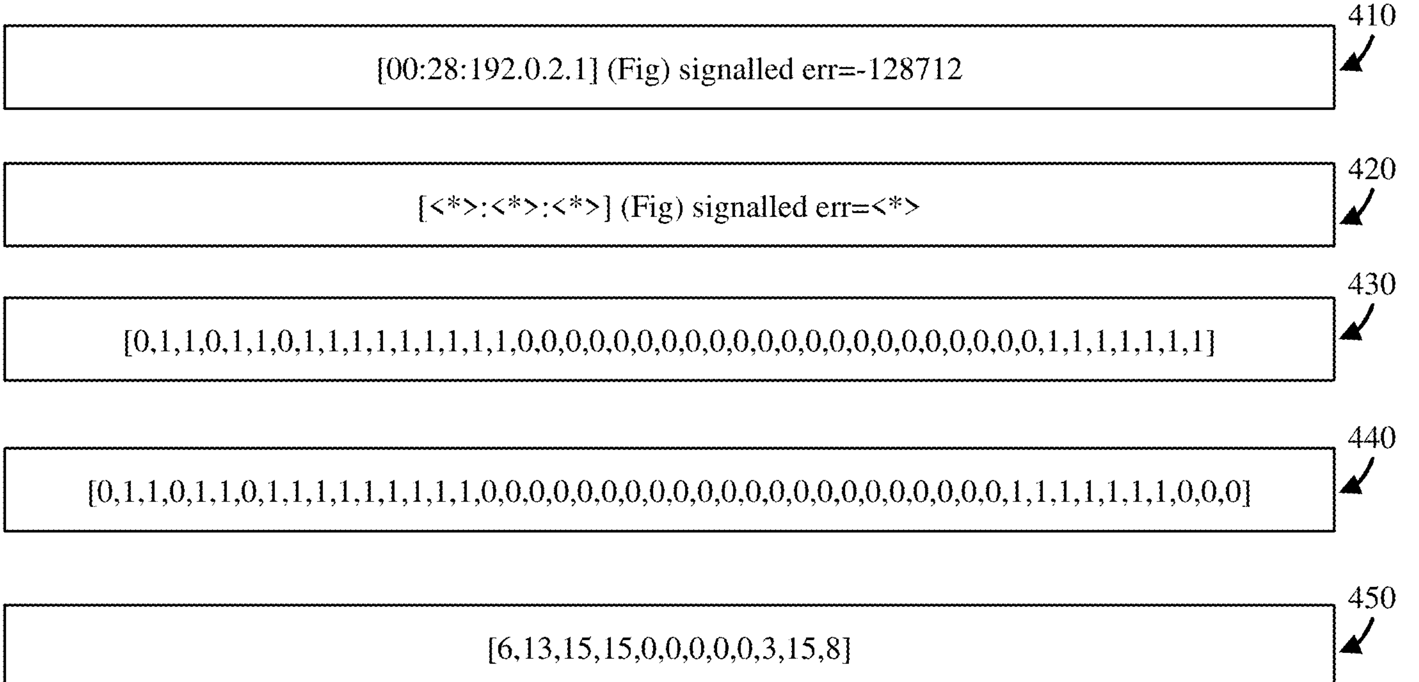
FIG. 4 depicts an example illustrating parameter masks and binary coded values generated during semantic log parsing.

FIG. 4 illustrates an example of parameter masks and binary coded values generated by a semantic log parser, such as the semantic log parser 320 of FIG. 3.

In the depicted example, a log message 410 is processed by the semantic log parser to generate a log template 420. The log message 410 includes both static and variable characters. The static characters (e.g., three colons and the string "[Fig] signalled err=") are retained in the log template 420, whereas four sets of consecutive variable characters (e.g., "00", "28", "192.0.2.1", and "128712") are replaced with four placeholders representing different parts of an IP address and an error code, respectively.

To accomplish this transformation, the semantic log parser can generate a sequence of parameter masks 430 to distinguish between static and variable characters. In this example, a character in the log message 410 is deemed static if its corresponding parameter mask 430 is zero, or variable if its corresponding parameter mask 430 is one. Alternatively, the parameter masks can be defined in the opposite manner, where zero indicates a variable character and one indicates a static character. The sequence of parameter masks 430 maps directly (one-to-one) to the characters in the log message 410, marking which portions should be replaced by placeholders in the log template 420.

In the depicted example, the original length of the log message 410 has 45 characters, i.e., L=45, and the down-sampling factor is set to 4, i.e., M=4. Because L=45 is not a multiple of M=4, padding is needed to ensure proper alignment for the down-sampling operation. To achieve this, the log message 410 can be padded with three space characters (e.g., at the end), extending its length to 48 characters, which is a multiple of M. As a result, the corresponding sequence of parameter masks 430 is also extended by appending three additional zeros, forming a modified sequence of parameter masks 440. This ensures that the parameter masks 440 align correctly with the padded log message and facilitates efficient down-sampling into N=L/M=12 tokens.

To generate the modified sequence of parameter masks 440, the semantic log parser can generate a sequence of twelve binary coded values 450. The binary coded values 450 encode the modified parameter masks 440 using a 4-bit encoding scheme, where each group of M=4 consecutive parameter masks 440 can be converted into a single decimal value ranging from 0 to 15. In other examples, the binary coded values can be represented using different numerical bases or encoding schemes, such as binary, octal, or higher-bit encodings. For instance, the 4-bit parameter masks can be encoded in hexadecimal notation (e.g., from 0 to F) or mapped to predefined symbolic representations or categorical labels/classes depending on the specific application requirements. A lookup table or the like can be used to map the sequence of binary coded values 450 to the sequence of parameter mask 430, where each binary coded value is decoded into four parameter masks at corresponding positions. Then, the sequence of parameter masks 440 can be used to generate the log template 420, including the padded spaces.

Example Process Flow of Semantic Log Parsing

Figure 5:
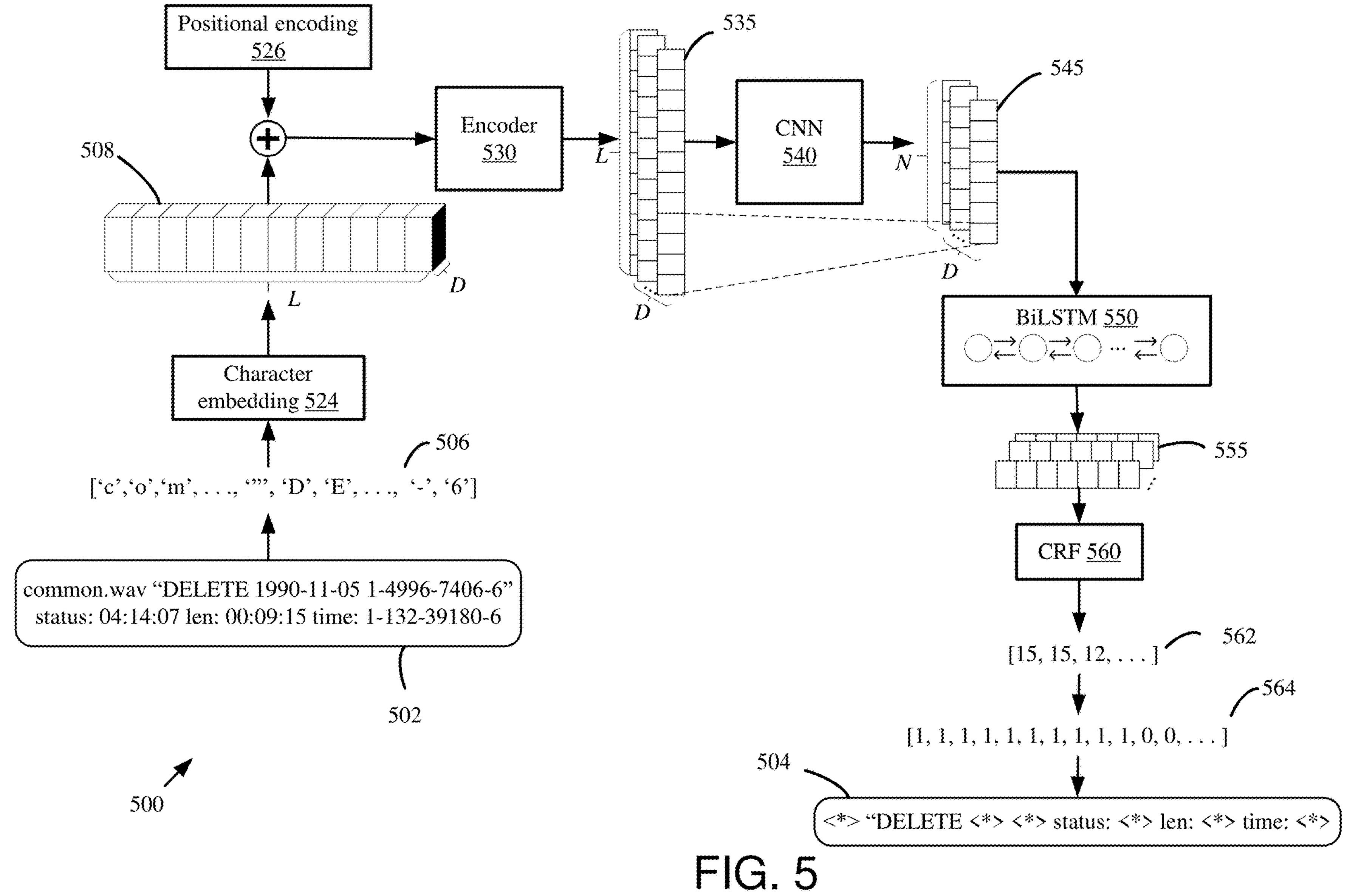
FIG. 5 is a flow diagram depicting an example process for semantic log parsing.

FIG. 5 illustrates an example process 500 for semantic log parsing using a character-level encoding and deep learning-based classification approach, which can be implemented by the semantic log parser 320 of FIG. 3.

The process 500 begins with receiving a log message 502, which includes a sequence of L characters, including both static and variable elements. The log message 502 can be padded (e.g., by adding spaces at the end), e.g., by a preprocessing unit (e.g., 322) to ensure that Z is a multiple of the predefined down-sampling factor M. The log message 502 is processed, e.g., by the semantic log parser, to generate a structured log template 504, where static characters are retained, and variable characters are replaced with one or more placeholders (e.g., "<*>" or the like).

The log message 502 is first converted into a sequence of individual characters 506, which is then processed by a character embedding unit 524 (similar to 324). The character embedding unit 524 transforms each character into a dense vector representation or embedding, producing an embedding matrix 508 of size L×D, where D is the embedding dimension.

The embeddings can be enriched with positional encoding 526, which injects positional information to help the downstream encoder 530 recognize character dependencies. In some examples, positional encoding 526 can be implemented using sinusoidal functions or learned position embeddings, where each position in the sequence is assigned a unique vector that encodes its relative or absolute position within the log message.

The positionally enriched embedding matrix can be passed to an encoder 530 (similar to 330). In some examples, the encoder 530 can be part of a transformer model including a self-attention mechanism. The encoder 530 is configured to process the positionally enriched embedding matrix to capture contextual dependencies among characters. The output of the encoder 530 can be an encoded feature matrix 535 (also referred to as a sequence of encoded feature vectors) of size L×D, where each row represents an encoded feature vector for a corresponding character in the log message 502.

To reduce computational complexity, the encoded feature matrix 535 is passed through a one-dimensional CNN 540, which can be an example embodiment of the down-sampler 340 of FIG. 3. The CNN 540 can group every M consecutive characters in the log message 502 into a single token, and aggregate the corresponding M encoded feature vectors into a single condensed feature vector by applying convolutional operations and non-linear transformations. To implement the down-sampling operations, the CNN 540 can have a non-overlapping kernel of size M and a stride of M, so that each character is assigned to exactly one token in the down-sampled representation. The output of the CNN 540 is a down-sampled feature matrix 545 of N×D, where N=ceil(L/M) is the number of tokens. Each row in this matrix represents a condensed feature vector corresponding to a tokenized segment of the original log message.

The down-sampled feature matrix 545 is then processed by a BiLSTM neural network 550, which can be an example implementation of the sequence model 350 of FIG. 3. The BiLSTM neural network 550 is configured to model long-range dependencies of its input in both forward and backward directions. This bidirectional processing allows each token's representation to incorporate contextual information from both preceding and succeeding tokens, helping the model better understand relationships between characters that are distant in the original sequence. As a result, each token's representation is contextualized, meaning it is no longer based solely on its own features but is enriched with sequential dependencies from the surrounding tokens. The output of the BiLSTM neural network 550 can be a matrix 555 including contextualized feature vectors, maintaining the same dimensions (N×D) as the down-sampled feature matrix 545, but now encoding richer information for improved classification in the next step.

The contextualized feature vectors of matrix 555 is then passed to a CRF neural network 560, which can be an example implementation of the classifier 360 of FIG. 3. The CRF neural network 560 is configured to jointly predict a label or class for each token based on learned dependencies. Specifically, the CRF neural network 560 models the conditional dependencies between adjacent tokens by jointly optimizing a structured prediction objective over a directed acyclic graph, leveraging transition probabilities between labels to improve classification accuracy over the entire sequence. In some examples, the CRF neural network 560 can output a sequence of N binary coded values 562, where each binary coded value represents a group of M characters using a predefined encoding scheme (e.g., a 4-bit encoding scheme with decimal values ranging from 0 to 15, or the like).

These binary coded values 562 can then be decoded into a sequence of L parameter masks 564, where each parameter mask in the sequence indicates whether the corresponding character in the original log message 502 is static (e.g., if the parameter mask is zero) or variable (e.g., if the parameter mask is one). The sequence of parameter masks 564 is positionally aligned with the original log message 502 such that each character's classification (e.g., static vs. variable) remains consistent with its original location.

Using the sequence of parameter masks 564, the log template 504 can be generated. The log template 504 retains static characters from the original log message 502, while replacing consecutive variable characters with one or more predefined placeholders (e.g., "<*>" or the like). The sequence and relative order of placeholders and static characters in the log template 504 are preserved, thereby maintaining structural consistency with the original log message 502.

Example Encoder Architecture

Figure 6:
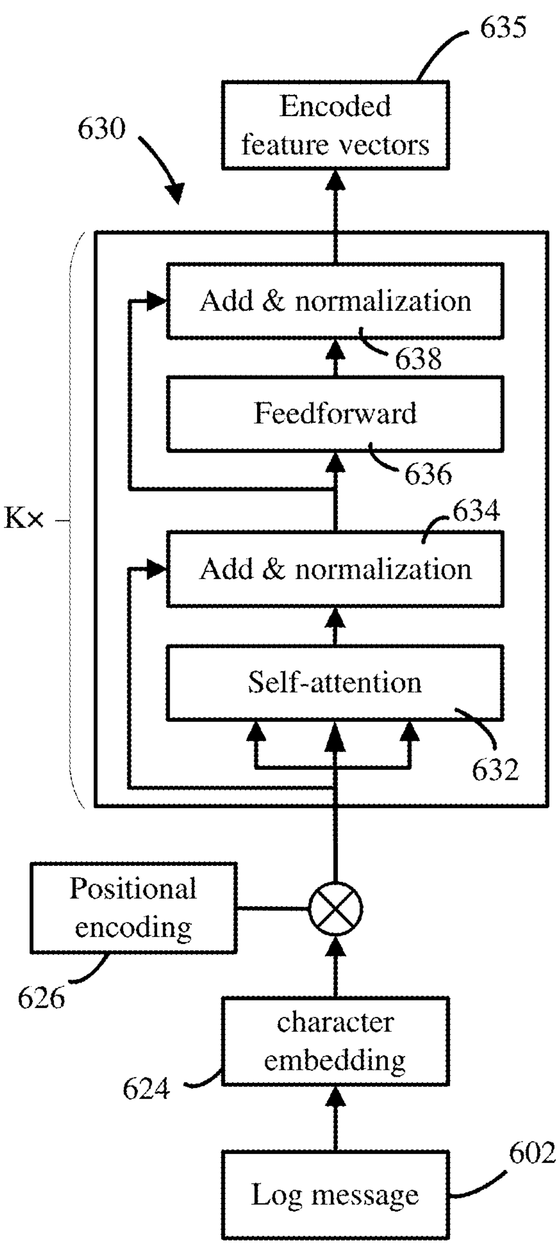
FIG. 6 depicts an example architecture of an encoder.

FIG. 6 illustrates an example encoder 630 for processing log messages, which can be an implementation of the encoders 330 and 530 described above. The architecture of the encoder 630 can be the same as or similar to that of a transformer model. The encoder 630 is configured to transform an input log message 602 into a sequence of encoded feature vectors 635 (similar to 535) by capturing contextual dependencies between characters while preserving structural information of the log message 602.

As shown, the log message 602 can be first processed through a character embedding unit 624 (similar to 324 and 524), which can convert each character into a dense vector representation or embedding in a continuous space. These embeddings encode semantic properties of individual characters, allowing the encoder 630 to learn relationships within the input sequence. Positional encoding 626 (similar to 326 and 526) can be added to the character embeddings to inject information about character positions within the log message 602. This allows the encoder 630 to distinguish the order of characters so that structural relationships are preserved during processing.

The positionally encoded embeddings are then input into the encoder 630. As shown, the encoder 630 can include one or more stacked layers, denoted as Kx, where K represents the number of layers. A higher K allows the encoder 630 to capture more complex dependencies with increased computational costs. In one specific example, the encoder 630 includes only one single layer (i.e., K=1).

Each layer of the encoder 630 includes a self-attention mechanism 632 (also referred to as "self-attention layer" or "self-attention neural network"), which can capture dependencies between characters within the log message 602. Specifically, the self-attention mechanism 632 can be configured to compute attention scores to determine the relevance of each character in relation to others, enabling the encoder 630 to focus on contextually important characters regardless of their position. This can be achieved using query, key, and value vectors, which help calculate attention weights, the details of which are described further below. This self-attention mechanism 632 allows the encoder 630 to model long-range dependencies, improving its ability to distinguish static and variable segments in the log message 602. The output of the self-attention mechanism 632 can be passed to an addition and normalization layer 634, which applies a residual connection by adding the output of the self-attention mechanism 632 to the original input of the layer, followed by normalization to stabilize training and improve gradient flow.

The output of the addition and normalization layer 634 can be processed by a feedforward neural network 636, which can apply non-linear transformations to further refine the feature representations. In some examples, the feedforward network 636 can be implemented as a multilayer perceptron (MLP) with one or more fully connected layers followed by a Rectified Linear Unit (ReLU) activation function.

The output of the feedforward neural network 636 can be passed through another addition and normalization layer 638. Similarly, this layer can apply a residual connection, where the input to the feedforward network 636 is added back to its output before applying normalization. The residual connection helps mitigate the vanishing gradient problem and enables better training convergence, while normalization ensures that the feature distributions remain consistent across different layers. If the encoder 630 has a single layer (e.g., K=1), the output of the addition and normalization layer 638 serves as the encoded feature vectors 635. On the other hand, if the encoder 630 has a multi-layer stacked structure (e.g., K>1), the output of layer 638 can be passed to the next layer of the encoder 630, where the process is repeated to refine the feature representations further.

Example Self-Attention Mechanism

FIG. 7 illustrates an example self-attention mechanism 700 which can be an embodiment of the self-attention mechanism 632 of FIG. 6.

As shown, the self-attention mechanism 700 can operate on queries (Q), keys (K), and values (V), which are matrices generated by applying learned linear transformations to the input sequence corresponding to each character in the input sequence (e.g., the log message 602). Each row in these matrices can represent a query, key, or value vector for a specific character. For example, a query vector represents the current character that needs to be encoded, a key vector represents a character in the input sequence, and a value vector represents the actual value of a character. The self-attention mechanism 700 computes attention scores (or "attentions") between the query vector and all key vectors, and these scores can be used to weigh the contribution of each value vector to the output. This process can be performed for all query vectors in parallel.

The self-attention mechanism 700 includes a first matrix multiplication, or MatMul unit 710, which receives the query Q and key K as inputs. The first MatMul unit 710 is configured to perform a matrix multiplication operation between Q and the transpose of K, generating an attention matrix including attention scores (or simply "attentions") calculated as dot products of Q and K, measuring the similarity between the current character (represented by the query) and each other character (represented by the key).

The generated attention matrix can be passed to a scaling unit 720, which can scale the attention matrix by dividing each attention by a scaling factor, such as the square root of the dimensions of the queries and keys. This scaling can help stabilize the magnitudes of the dot products, preventing them from becoming too large.

The self-attention mechanism 700 can also include a masking unit 730, which can be used to prevent certain positions from attending to subsequent positions. Specifically, the masking unit 730 can be configured to apply an attention mask to the attention matrix. In some examples, this attention mask can assign zero or negative values (e.g., representing negative infinity) to specific positions in the attention matrix, preventing the model from considering certain characters during attention calculations. In some implementations, masking can be optional, The output of the masking unit 730 can be passed through a softmax activation layer 740. The softmax activation layer 740 can be configured to apply a softmax function to the output of the masking unit 730, generating a distribution of attention weights. This ensures that the weights are positive and sum to one so that they can be interpreted as probabilities.

The self-attention mechanism 700 can further include a second MatMul unit 750 which receives the output of the softmax activation layer 740 and the input value V. The second MatMul unit 750 can be configured to perform a matrix multiplication operation to generate the output of the self-attention mechanism 700, which represents a weighted sum of the values, with the weights determined by the attention mechanism. The output of the self-attention mechanism 700 can be used for subsequent processing (e.g., as an input to the addition and normalization layer 634 of FIG. 6).

Example Multi-Head Attention

Self-attention mechanism can implement as single-head or multi-head attention mechanisms. Single-head attention uses one set of attention weights, while multi-head attention uses multiple sets in parallel to capture different aspects of the input sequence.

Figure 8:
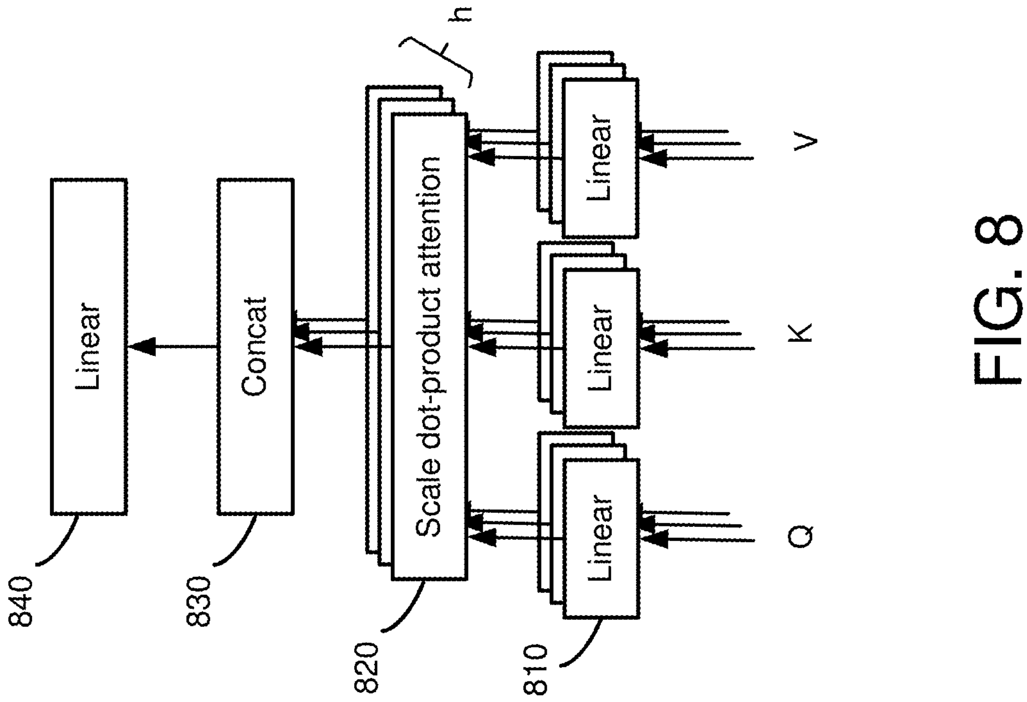
FIG. 8 depicts an example multi-head attention mechanism.

Multi-head attention allows the encoder to capture different types of dependencies among characters from multiple representation subspaces at different positions in the input sequence. This contrasts with the single-head attention mechanism which only captures dependencies from one representation subspace, potentially missing out on other important relationships among characters. FIG. 8 illustrates an example of a multi-head attention mechanism 800.

The multi-head attention mechanism 800 includes three sets of linear activation layers 810 which respectively receive queries (Q), keys (K), and values (V). Each set of linear activation layers 810 can apply a learned linear transformation to its respective input, projecting them into different representation spaces. These transformed Q, K, and V are then passed to a set of scaled dot-product attention layers 820.

More specifically, the queries (Q), keys (K), and values (V) can be linearly projected h times with different, learned linear projections to $d_k$, $d_k$, and $d_v$ dimensions, respectively, where $d_k$ refers to the dimension of the keys (K) and queries (Q), and $d_v$ refers to the dimension of the values (V). These projections are performed h times, resulting in h different sets of queries (Q), keys (K), and values (V). Each set captures different aspects of the input data, allowing the model to attend to different features and relationships in the data.

Each of these attention layers 820 can be configured to apply the scaled dot-product attention mechanism (as described above with reference to FIG. 7) to the transformed Q, K, and V, generating a set of initial outputs. These initial outputs represent the attention outputs for each head in the multi-head attention mechanism 800. Each head can attend to different features in the input, thereby capturing different types of dependencies among characters.

The initial outputs of the attention layers 820 can then be concatenated by a concatenator 830. This concatenation operation combines the outputs of the multiple attention heads into a single matrix, which captures a more comprehensive representation of the dependencies among characters, as it includes information from multiple representation subspaces.

Finally, another linear activation layer 840 can apply a learned linear transformation to the concatenated output, generating the final output of the multi-head attention mechanism 800. This final output is a context-rich representation of the original input sequence, capturing information from different representation subspaces at different positions.

Example Overall Method for Semantic Log Parsing

Figure 9:
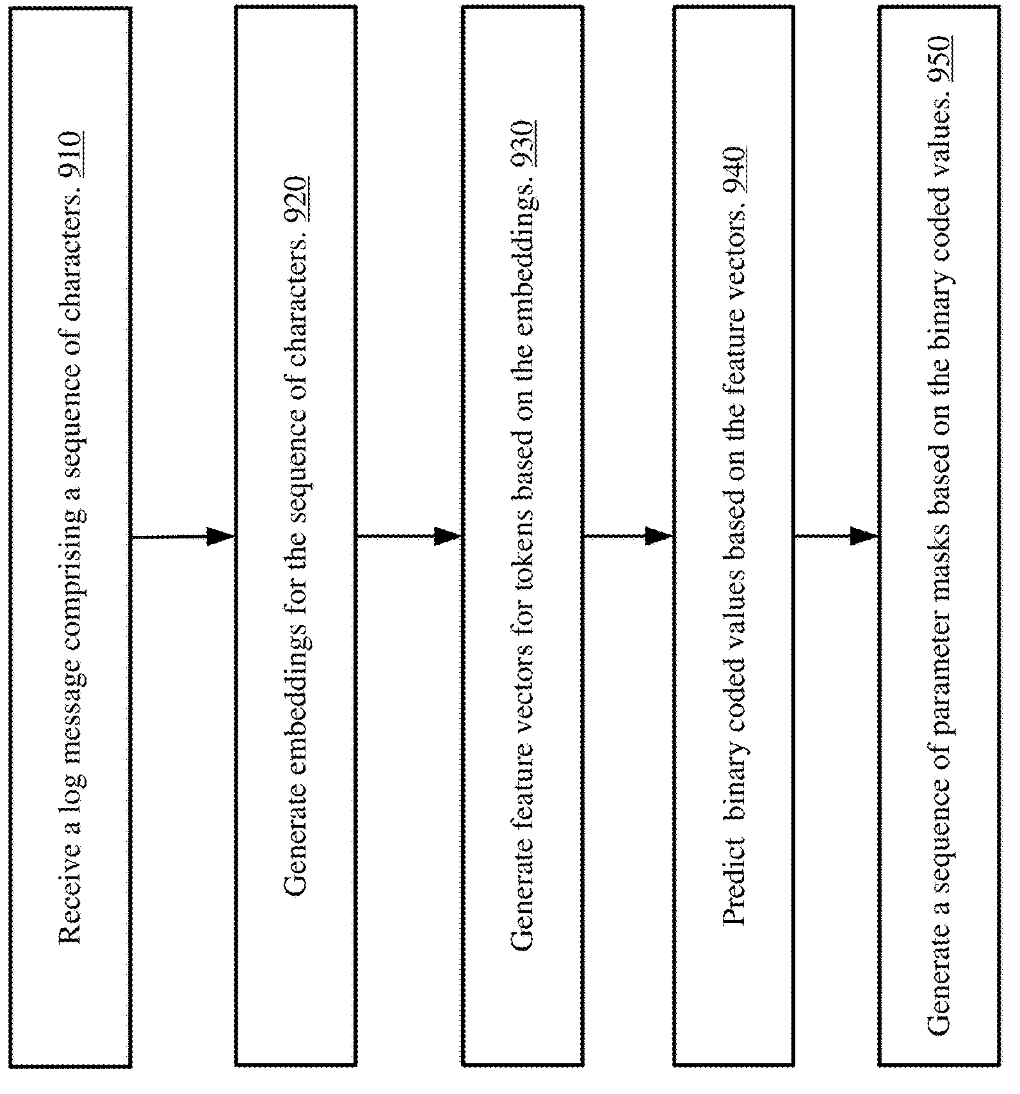
FIG. 9 is a flowchart illustrating an example overall method for semantic log parsing.

FIG. 9 is a flowchart describing an overall method 900 for performing semantic log parsing. The method 900 can be implemented by the semantic log parser 320 of FIG. 3.

At step 910, the method can receive a log message having a sequence of L characters, where L is a positive integer.

In some examples, the method can pad the log message with one or more predefined padding characters responsive to determining that L is not a multiple of M.

At step 920, the method can generate embeddings for the sequence of L characters.

At step 930, the method can generate feature vectors for N tokens based on the embeddings. A token represents M consecutive characters in the log message, wherein M is an integer that is greater than one, and N is the smallest integer greater than or equal to L divided by M.

In some examples, generating feature vectors for N tokens includes converting the embeddings into encoded feature vectors for the sequence of L characters. The converting can be performed by an encoder including a self-attention neural network configured to measure contextual dependencies between characters in the log message.

In some examples, generating feature vectors for N tokens further includes down-sampling the encoded feature vectors for the sequence of L characters using a one-dimensional convolutional neural network.

In some examples, the one-dimensional convolutional neural network has a non-overlapping kernel of size M and a stride of M.

At step 940, the method can predict N binary coded values based on the feature vectors for N tokens.

In some examples, predicting N binary coded values includes processing the feature vectors for N tokens using a bidirectional long short-term memory neural network to generate sequential feature representations for the N tokens.

In some examples, predicting N binary coded values further includes processing the sequential feature representations for the N tokens using a conditional random field neural network.

At step 950, the method can generate a sequence of L parameter masks based on the N binary coded values. A parameter mask indicates that a corresponding character in the log message is a static character or a variable character.

In some examples, generating the sequence of L parameter masks includes mapping each one of the N binary coded values into parameter masks for M consecutive characters within a corresponding token.

In some examples, the method can further generate a log template as a structured representation of the log message. The log template retains static characters from the log message and replaces variable characters in the log message with one or more placeholders. Static characters and placeholders in the log template are positionally aligned with their corresponding characters in the log message.

In some examples, the method can further includes training the conditional random field neural network using a labelled dataset comprising a plurality of input log messages and a plurality of ground truth log templates corresponding to the plurality of input log messages. In some examples, the training uses a negative log-likelihood loss function to minimize a prediction error in classifying static and variable characters within the plurality of input log messages based on the plurality of ground truth log templates.

The method 900 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Model Training

The semantic log parser described herein (e.g., 320) can be trained using a supervised learning approach, leveraging a labeled dataset of log messages (e.g., 392) and their corresponding (verified) structured log templates (e.g., 394). In one specific use case, training of the semantic log parser can be performed using the Log hub 2.0 dataset, which includes 50,000 log lines selected to maximize diversity and balance template representation. The semantic log parser can be trained to predict parameter masks for each character in a log message, allowing it to differentiate between static and variable components. In some examples, batch-based training can be used, where multiple log sequences are processed in parallel, to optimize performance.

In some examples, the trainable parameters in the semantic log parser 320 include weights in the neural networks (e.g., self-attention neural network and feedforward neural network) included in the encoder 330, weights of the convolutional filters in the CNN-based down-sampler 340, weights of the recurrent connections in the sequence model 350 (e.g., the BiLSTM neural network), and transition weights in the classifier 360 (e.g., the CRF neural network).

In some examples, the semantic log parser 320 can be trained using a negative log-likelihood loss (NLL) function, which is particularly well-suited for structured prediction tasks involving CRF neural network, as it optimizes the likelihood of the correct sequence over the entire log message. Other components of the semantic log parser 320, such as the encoder 330, down-sampler 340, and sequence model 350 can be trained indirectly through backpropagation, where the gradients from the CRF neural network propagate backward to update the model parameters. In some examples, optimization can be performed using gradient descent, which iteratively updates model parameters to minimize the loss. In one specific example, Pytorch Lightning can be used as a neural network framework to train the system. The training implied a learning rate of $1e^{-3}$, batch size of 16 and weight decay of $1e^{-4}$ to prevent overfitting.

In some examples, hyperparameters such as embedding dimension, CNN kernel size, BiLSTM hidden size, etc., can be optimized through grid search and cross-validation. In one specific implementation, the trained semantic log parser 320 includes about 312 k parameters with a 4.2 MB footprint, which is significantly smaller than typical LLMs, allowing for efficient deployment in resource-constrained environments while maintaining high parsing accuracy and computational efficiency.

Example Experiments

Experimental studies were conducted to evaluate the performance of semantic log parsing technologies disclosed herein. As examples, FIG. 10 presents a comparative analysis of various log parsers, illustrating both efficiency (log lines processed per second) in graph 1000 and parsing accuracy (PA) and F1-template accuracy (F1-TA) in table 1050. The disclosed semantic log parser, denoted as "4BitParser," demonstrates a favorable balance between computational efficiency and parsing accuracy, achieving high throughput while maintaining accuracy comparable to LLM-based log parsers. A different version of the semantic log parser, referred to as "Cacheless-4BitParser," is also evaluated, which operates without a parsing cache (e.g., 315), in contrast to the 4BitParser, which utilizes a parsing cache to enhance efficiency.

As shown in graph 1000, traditional syntax-based log parsers such as Drain and Brain exhibit the highest throughput, processing over 900 log lines per second, due to their reliance on fixed-depth tree structures for template extraction. However, as indicated in table 1050, these methods achieve very low parsing accuracy (PA≤0.32) and F1-template accuracy (F1-TA≤0.33) because they rely on heuristic-based token matching, making them less adaptable to unseen log formats.

In contrast, Log PPT, a semantic log parser leveraging a pre-trained transformer, introduces significant computational overhead (processing fewer than 100 log lines per second, as shown in graph 1000) while providing only a negligible improvement in accuracy (PA=0.34, F1-TA=0.33).

The LLM-based parser (LILAC) can achieve higher accuracy (PA=0.60, F1-TA=0.61) by utilizing in-context learning and adaptive parsing caching, but it is computationally expensive, resulting in the lowest throughput rate among all log parsers tested.

On the other hand, the 4BitParser (which has almost 100 times less trainable parameters compared to LILAC) achieves the highest parsing accuracy (PA=0.64, F1-TA=0.60) while significantly improving throughput (processing over 400 log lines per second, as shown in graph 1000) compared to LILAC. The Cacheless-4BitParser, which removes the parsing cache, shows a decrease in throughput, highlighting the efficiency benefits of caching in high-volume logging environments. However, even without a parsing cache, Cacheless-4BitParser still outperforms LILAC in terms of throughput, demonstrating that the core architecture of the disclosed semantic log parser is inherently more efficient than LLM-based approaches.

It should be understood that the 4BitParser implementation shown in FIG. 10 is just one example embodiment, where M=4 is used for down-sampling operations. However, this approach should not be considered limiting, as the disclosed semantic log parsing techniques can be adapted to different down-sampling factors (M>1). The experimental results shown in FIG. 10 confirm that the disclosed technologies offer a scalable and resource-efficient alternative to LLM-based log parsers, providing a balance of speed, accuracy, and adaptability for real-world log parsing applications.

Example Advantages

The technologies described herein offer several technical advantages.

At the outset, the semantic log parser disclosed herein introduces a unique architecture that integrates an encoder, a CNN-based down-sampler, a BiLSTM-based sequence model, and a CRF-based classifier, each of which contributes to improved accuracy, efficiency, and adaptability of log parsing. This unique architecture enables the system to extract log templates with high precision while maintaining computational efficiency that is comparable to syntax-based parsers.

One significant advantage of the disclosed approach is the integration of down-sampling (e.g., using a CNN) before sequence modeling. Traditional semantic log parsers that operate at the character level incur high computational overhead in subsequent processing stages. By grouping a predefined number (M) of consecutive characters into a single token, the down-sampler reduces the sequence length by a factor of approximately M while preserving essential semantic information. This dimensionality reduction significantly decreases the computational burden on the subsequent layers (e.g., BiLSTM and CRF neural networks), as these components now process a shorter sequence without sacrificing parsing accuracy. Additionally, the down-sampler further enhances local feature extraction, ensuring that meaningful structural patterns within the log messages are retained before higher-level sequence modeling (e.g., by the BiLSTM neural network).

The BiLSTM-based sequence model provides another important advantage over conventional models that rely on unidirectional Long Short-Term Memory (LSTM) networks. Unlike standard LSTM networks, which only capture past dependencies, the BiLSTM neural network processes the (down-sampled) feature vectors bidirectionally, incorporating both past and future context when generating sequential feature representations. This long-range dependency modeling is particularly beneficial for log parsing, as log templates often contain complex structural relationships that span across multiple tokens. The contextualized feature representations generated by the BiLSTM neural network allow for more precise differentiation between variable and static characters, leading to improved classification performance.

Another technical advantage of the disclosed semantic log parser is the use of a CRF-based classifier, rather than a conventional linear classification layer. While a linear layer makes independent predictions for each token, the CRF neural network models label dependencies by optimizing a structured prediction objective over a directed acyclic graph. This approach ensures that the predicted labels (representing the sequence of parameter masks) are globally optimized rather than relying on isolated token-level decisions. By leveraging transition probabilities between adjacent tokens, the CRF neural network can enhance label consistency and reduce the likelihood of misclassifications in structured log templates. This joint decoding strategy can lead to more accurate and coherent log parsing results compared to standard classifiers.

As described above, compared to conventional semantic parsers, which often require larger models and higher computational resources, the disclosed semantic log parser achieves accuracy comparable to the most advanced LLM-based log parser, while maintaining throughput closer to syntax-based parsers. The unique architectural design of the semantic log parser disclosed here enables it to scale efficiently, making it suitable for high-volume log processing environments where both speed and accuracy are critical.

Example Computing Systems

Figure 11:
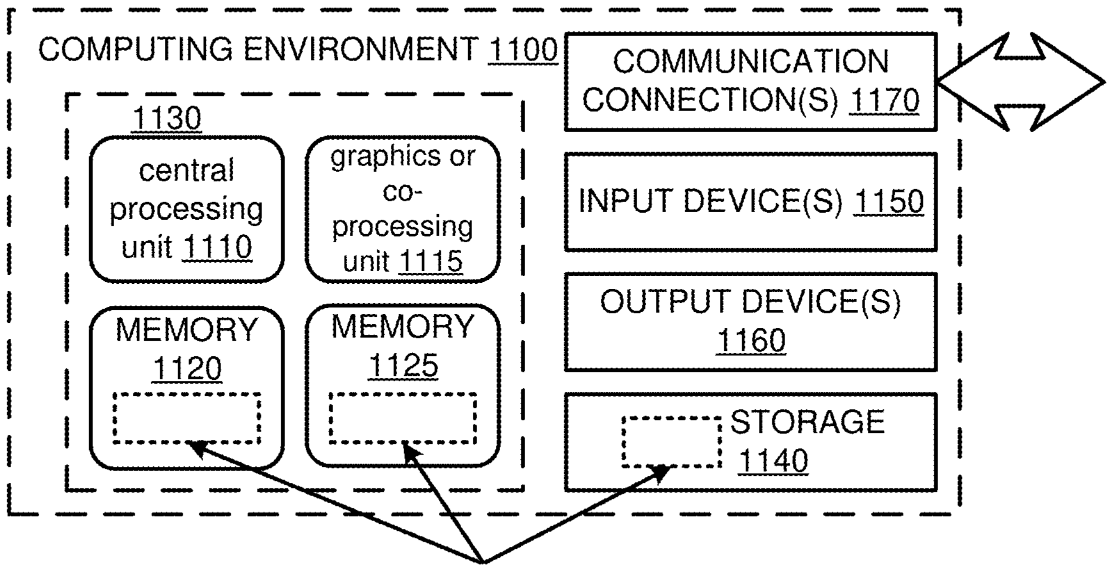
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the method 900). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

A computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 can store instructions for the software implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 12:
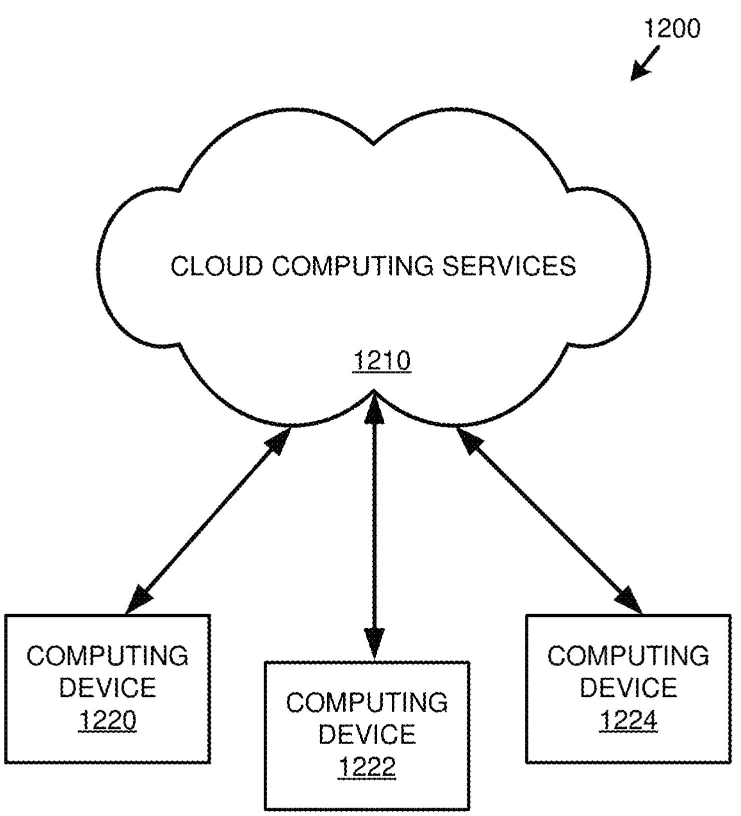
FIG. 12 is a block diagram of an example cloud computing environment that can be used in conjunction with the technologies described herein.

FIG. 12 depicts an example cloud computing environment 1200 in which the described technologies can be implemented, including, e.g., the system 300 and other systems herein. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

EXAMPLE CLAUSES

Any of the following clauses can be implemented.

Clause 1. A computing system comprising: memory; one or more hardware processors coupled to the memory; and one or more non-transitory computer readable storage media storing instructions that, when loaded into the memory, cause the one or more hardware processors to perform operations comprising: receiving a log message comprising a sequence of L characters, wherein L is a positive integer; generating embeddings for the sequence of L characters; generating feature vectors for N tokens based on the embeddings, wherein a token represents M consecutive characters in the log message, wherein M is an integer greater than one, and N is a smallest integer greater than or equal to L divided by M; predicting N binary coded values based on the feature vectors for N tokens; and generating a sequence of L parameter masks based on the N binary coded values, wherein a parameter mask indicates that a corresponding character in the log message is a static character or a variable character.

Clause 2. The computing system of clause 1, wherein the operations further comprise generating a log template as a structured representation of the log message, wherein the log template retains static characters from the log message and replaces variable characters in the log message with one or more placeholders, wherein static characters and placeholders in the log template are positionally aligned with their corresponding characters in the log message.

Clause 3. The computing system of any one of clauses 1-2, wherein generating the sequence of L parameter masks comprises mapping each one of the N binary coded values into parameter masks for M consecutive characters within a corresponding token.

Clause 4. The computing system of any one of clauses 1-3, wherein the operations further comprises padding the log message with one or more predefined padding characters responsive to determining that L is not a multiple of M.

Clause 5. The computing system of any one of clauses 1-4, wherein generating feature vectors for N tokens comprises converting the embeddings into encoded feature vectors for the sequence of L characters, wherein the converting is performed by an encoder comprising a self-attention neural network configured to measure contextual dependencies between characters in the log message.

Clause 6. The computing system of clause 5, wherein generating feature vectors for N tokens further comprises down-sampling the encoded feature vectors for the sequence of L characters using a one-dimensional convolutional neural network.

Clause 7. The computing system of clause 6, wherein the one-dimensional convolutional neural network has a non-overlapping kernel of size M and a stride of M.

Clause 8. The computing system of any one of clauses 1-7, wherein predicting N binary coded values comprises processing the feature vectors for N tokens using a bidirectional long short-term memory neural network to generate sequential feature representations for the N tokens.

Clause 9. The computing system of clause 8, wherein predicting N binary coded values further comprises processing the sequential feature representations for the N tokens using a conditional random field neural network.

Clause 10. The computing system of clause 9, wherein the operations further comprise training the conditional random field neural network using a labelled dataset comprising a plurality of input log messages and a plurality of ground truth log templates corresponding to the plurality of input log messages, wherein the training uses a negative log-likelihood loss function to minimize a prediction error in classifying static and variable characters within the plurality of input log messages based on the plurality of ground truth log templates.

Clause 11. A computer-implemented method comprising: receiving a log message comprising a sequence of L characters, wherein L is a positive integer; generating embeddings for the sequence of L characters; generating feature vectors for N tokens based on the embeddings, wherein a token represents M consecutive characters in the log message, wherein M is an integer greater than one, and N is a smallest integer greater than or equal to L divided by M; predicting N binary coded values based on the feature vectors for N tokens; and generating a sequence of L parameter masks based on the N binary coded values, wherein a parameter mask indicates that a corresponding character in the log message is a static character or a variable character.

Clause 12. The computer-implemented method of clause 11, further comprising generating a log template as a structured representation of the log message, wherein the log template retains static characters from the log message and replaces variable characters in the log message with one or more placeholders, wherein static characters and placeholders in the log template are positionally aligned with their corresponding characters in the log message.

Clause 13. The computer-implemented method of any one of clauses 11-12, wherein generating the sequence of L parameter masks comprises mapping each one of the N binary coded values into parameter masks for M consecutive characters within a corresponding token.

Clause 14. The computer-implemented method of any one of clauses 11-13, further comprising padding the log message with one or more predefined padding characters responsive to determining that L is not a multiple of M.

Clause 15. The computer-implemented method of any one of clauses 11-14, wherein generating feature vectors for N tokens comprises converting the embeddings into encoded feature vectors for the sequence of L characters, wherein the converting is performed by an encoder comprising a self-attention neural network configured to measure contextual dependencies between characters in the log message.

Clause 16. The computer-implemented method of clause 15, wherein generating feature vectors for N tokens further comprises down-sampling the encoded feature vectors for the sequence of L characters using a one-dimensional convolutional neural network.

Clause 17. The computer-implemented method of clause 16, wherein the one-dimensional convolutional neural network has a non-overlapping kernel of size M and a stride of M.

Clause 18. The computer-implemented method of any one of clauses 11-17, wherein predicting N binary coded values comprises processing the feature vectors for N tokens using a bidirectional long short-term memory neural network to generate sequential feature representations for the N tokens.

Clause 19. The computer-implemented method of clause 18, wherein predicting N binary coded values further comprises processing the sequential feature representations for the N tokens using a conditional random field neural network.

Clause 20. One or more non-transitory computer-readable media having encoded thereon computer-executable instructions causing one or more processors to perform a method, the method comprising: receiving a log message comprising a sequence of L characters, wherein L is a positive integer;

generating embeddings for the sequence of L characters; generating feature vectors for N tokens based on the embeddings, wherein a token represents M consecutive characters in the log message, wherein M is an integer greater than one, and N is a smallest integer greater than or equal to L divided by M; predicting N binary coded values based on the feature vectors for N tokens; and generating a sequence of L parameter masks based on the N binary coded values, wherein a parameter mask indicates that a corresponding character in the log message is a static character or a variable character.

The technologies from any clause can be combined with the technologies described in any one or more of the other clauses.

In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

memory;

one or more hardware processors coupled to the memory; and one or more non-transitory computer readable storage media storing instructions that, when loaded into the memory, cause the one or more hardware processors to perform operations comprising:

receiving a log message comprising a sequence of L characters, wherein L is a positive integer;

generating embeddings for the sequence of L characters;

generating feature vectors for N tokens based on the embeddings, wherein a token represents M consecutive characters in the log message, wherein M is an integer greater than one, and N is a smallest integer greater than or equal to L divided by M;

predicting N binary coded values based on the feature vectors for N tokens;

generating a sequence of L parameter masks based on the N binary coded values, wherein a parameter mask indicates that a corresponding character in the log message is a static character or a variable character; and generating, using the sequence of L parameter masks, a log template as a structured representation of the log message.

2. The computing system of claim 1, wherein the log template retains static characters from the log message and replaces variable characters in the log message with one or more placeholders, wherein static characters and placeholders in the log template are positionally aligned with their corresponding characters in the log message.

3. The computing system of claim 1, wherein generating the sequence of L parameter masks comprises mapping each one of the N binary coded values into parameter masks for M consecutive characters within a corresponding token.

4. The computing system of claim 1, wherein the operations further comprises padding the log message with one or more predefined padding characters responsive to determining that L is not a multiple of M.

5. The computing system of claim 1, wherein generating feature vectors for N tokens comprises converting the embeddings into encoded feature vectors for the sequence of L characters, wherein the converting is performed by an encoder comprising a self-attention neural network configured to measure contextual dependencies between characters in the log message.

6. The computing system of claim 5, wherein generating feature vectors for N tokens further comprises down-sampling the encoded feature vectors for the sequence of L characters using a one-dimensional convolutional neural network.

7. The computing system of claim 6, wherein the one-dimensional convolutional neural network has a non-overlapping kernel of size M and a stride of M.

8. The computing system of claim 1, wherein predicting N binary coded values comprises processing the feature vectors for N tokens using a bidirectional long short-term memory neural network to generate sequential feature representations for the N tokens.

9. The computing system of claim 8, wherein predicting N binary coded values further comprises processing the sequential feature representations for the N tokens using a conditional random field neural network.

10. The computing system of claim 9, wherein the operations further comprise training the conditional random field neural network using a labelled dataset comprising a plurality of input log messages and a plurality of ground truth log templates corresponding to the plurality of input log messages, wherein the training uses a negative log-likelihood loss function to minimize a prediction error in classifying static and variable characters within the plurality of input log messages based on the plurality of ground truth log templates.

11. A computer-implemented method comprising:

receiving a log message comprising a sequence of L characters, wherein L is a positive integer;

generating embeddings for the sequence of L characters;

generating feature vectors for N tokens based on the embeddings, wherein a token represents M consecutive characters in the log message, wherein M is an integer greater than one, and N is a smallest integer greater than or equal to L divided by M;

predicting N binary coded values based on the feature vectors for N tokens;

generating a sequence of L parameter masks based on the N binary coded values, wherein a parameter mask indicates that a corresponding character in the log message is a static character or a variable character; and generating, using the sequence of L parameter masks, a log template as a structured representation of the log message.

12. The computer-implemented method of claim 11, wherein the log template retains static characters from the log message and replaces variable characters in the log message with one or more placeholders, wherein static characters and placeholders in the log template are positionally aligned with their corresponding characters in the log message.

13. The computer-implemented method of claim 11, wherein generating the sequence of L parameter masks comprises mapping each one of the N binary coded values into parameter masks for M consecutive characters within a corresponding token.

14. The computer-implemented method of claim 11, further comprising padding the log message with one or more predefined padding characters responsive to determining that L is not a multiple of M.

15. The computer-implemented method of claim 11, wherein generating feature vectors for N tokens comprises converting the embeddings into encoded feature vectors for the sequence of L characters, wherein the converting is performed by an encoder comprising a self-attention neural network configured to measure contextual dependencies between characters in the log message.

16. The computer-implemented method of claim 15, wherein generating feature vectors for N tokens further comprises down-sampling the encoded feature vectors for the sequence of L characters using a one-dimensional convolutional neural network.

17. The computer-implemented method of claim 16, wherein the one-dimensional convolutional neural network has a non-overlapping kernel of size M and a stride of M.

18. The computer-implemented method of claim 11, wherein predicting N binary coded values comprises processing the feature vectors for N tokens using a bidirectional long short-term memory neural network to generate sequential feature representations for the N tokens.

19. The computer-implemented method of claim 18, wherein predicting N binary coded values further comprises processing the sequential feature representations for the N tokens using a conditional random field neural network.

20. One or more non-transitory computer-readable media having encoded thereon computer-executable instructions causing one or more processors to perform a method, the method comprising:

receiving a log message comprising a sequence of L characters, wherein L is a positive integer;

generating embeddings for the sequence of L characters;

generating feature vectors for N tokens based on the embeddings, wherein a token represents M consecutive characters in the log message, wherein M is an integer greater than one, and N is a smallest integer greater than or equal to L divided by M;

predicting N binary coded values based on the feature vectors for N tokens;

generating a sequence of L parameter masks based on the N binary coded values, wherein a parameter mask indicates that a corresponding character in the log message is a static character or a variable character; and generating, using the sequence of L parameter masks, a log template as a structured representation of the log message.

* * * * *